Silylation of the pyrogenic silica filler can be achieved by contacting the filler with a silylating agent of the formula, $$(R_3Si)_aZ$$

where R is as previously defined, $a$ is an integer equal to 1 or 2, and Z is a radical selected from $-OH, -NRX, -ONR_2, -SR, -O\overset{O}{\underset{\|}{C}}R, -O-, -\overset{X}{\underset{|}{N}}- \text{ and } -S-$ where X is selected from the group consisting of H and R where R is as above defined and is preferably H, lower alkyl or cyclo alkyl. Silylating agents included by the above formula are for example, triorganosilylmercaptans, triorganosilylacylates, triorganosilylalkylamines, for example, the following alkyl-substituted silylalkylamines; trimethylsilylisopropylamine, trimethylsilylethylamine, dimethylphenylsilylpropylamine, dimethylvinylsilylbutylamine, etc.; triorganosilylaminoxy compounds, such as diethylaminoxytrimethylsilane, diethylaminoxydimethylphenylsilane;

silylating compounds shown by Klebe, Patent 3,397,220 assigned to the same assignee as the present invention, etc. There also can be employed disilyl compounds, such as disiloxanes, for example, hexamethyldisiloxane, 1,3-divinyltetramethyldisiloxane, 1,3 - diphenyltetramethyldisiloxane, etc.; silazanes, such as hexamethyldisilazane, 1,3-diphenylhexamethyldisilazane, etc.

Preferably, the above-described filler is pre-treated with ammonia, or ammonia derivatives such as primary amines, for example, isopropylamine, hydroxylamine compounds such as diethylhydroxylamine, etc., prior to silylation with the above described silylating agents. A further treatment with an alkylcyclopolysiloxane, such as octamethylcyclotetrasiloxane prior to such silylation and either before or after treatment with ammonia is particularly preferred. For example, untreated silica filler made by burning a chlorosilane can be contacted with ammonia by vigorously agitating the filler in an ammonia atmosphere at atmospheric pressures at temperatures between 25° C. to 150° C. at period of between ½ hour to 24 hours. The resulting silica filler after such contact with ammonia can be further treated with an alkylcyclopolysiloxane in accordance with standard techniques as described by the aforementioned Lucas patent. Alternatively, the treatment of the filler with the aforementioned alkylcyclopolysiloxane can precede the contact with ammonia. After the filler has been contacted with ammonia and the alkyl cyclopolysiloxane, it can be silylated with any one or more of the above-described silylating agents at temperatures of between 25° C. to 200° C. for ½ hour or less to 14 days or more, preferably from 1 to 24 hours. The optimum silylating conditions will depend upon the particular choice of silylating agent employed. Optimum results, however, will be achieved when the surface of the silica filler has been treated to provide for about 2 percent to 20 percent by weight of chemically combined triorganosiloxy units of Formula 1 based on the weight of the untreated filler. The presence of such triorganosiloxy units can be determined by spectrographic means, such as by infrared analysis. Calculations with respect to weight percent of triorganosiloxy units of Formula 1 can be based on elemental analysis for carbon and hydrogen through carbon dioxide and water determinations.

In addition to the curing agent, silanol-containing polydiorganosiloxane and the above-described pyrogenic silica filler, the room temperature vulcanizing compositions of the present invention also can contain an organosilicon process aid. The purpose of the process aid is to improve the flow characteristics of the room temperature vulcanizing composition, so that it can be readily dispensed from containers such as a tube or cartridge. In instances where the viscosity of the silanol-containing polydiorganosiloxane exceeds about 30,000 centipoises at 25° C., it is preferred to employ about 5 to 40 parts of process aid per 100 parts of the silanol-containing polydiorganosiloxane. Patent 3,382,205—Beers, assigned to the same assignee as the present invention, includes a process aid which can be employed in the practice of the invention. For example, the process aid can be composed of chemically combined units of Formula 1, $R_2SiO$ units and $RSiO_{1.5}$ units and can contain from .02 percent to 2.0 percent by weight of hydroxy radicals attached to silicon, based on the weight of process aid. There can be used from about 2 to about 50 parts of process aid, and preferably 5 to 40 parts, per 100 parts of silanol-containing polydiorganosiloxane. The process aid can have a ratio of $R_3SiO_{0.5}$ units to $R_2SiO$ units of about 0.11 to 1.4, inclusive, and a ratio of units of Formula 1 to $R_2SiO$ units of from about 0.02 to about 1, inclusive. In addition to the organosilicon process aid of Patent 3,382,205, other process aids which can be employed include polydiorganosiloxane fluids having terminal triorganosiloxy units, such as polydimethylsiloxane fluids having terminal trimethylsiloxy units having viscosities of from 5 to 500,000 centipoises at 25° C. and preferably 20 to 1,000 centipoises.

The room temperature vulcanizing composition of the present invention also can contain various extending fillers and pigments in addition to the above-described pyrogenic silica filler which must be employed at from at least 5 parts to as high as 40 parts, per 100 parts of the silanol-containing polydiorganosiloxane. There can be employed up to 200 parts of extending filler, per 100 parts of the silanol-containing polydiorganosiloxane. There are included by the extending fillers, such materials, for example, as titanium dioxide, zirconium silicate, silica aerogel, iron oxide, diatomaceous earth, glass fibers, polyvinylchloride and ground quartz. The total amount of pyrogenic silica filler and extending filler which can be employed can vary from 5 to 240 parts, per 100 parts of the silanol-containing polydiorganosiloxane. Preferably, a proportion of from 15 to 40 parts of extending filler, and from 15 to 35 parts of pyrogenic silica filler can be used. In addition, the room temperature vulcanizing composition can contain curing accelerators such as dibutyl tin dilaurate, carboxylic acid salts of lead, zinc, etc., at from 0.001 to 1 percent by weight of metal based on the weight of room temperature vulcanizing compositions. In addition to the aforementioned curing accelerators, there also can be employed heat stabilizers, such as iron oxide, cerium neodeconate, rare earth octoate, etc.

The room temperature vulcanizing compositions of the present invention can be made by mixing the above-described ingredients together under substantially anhydrous conditions to provide for a mixture having up to about 100 parts of water per million parts of room temperature vulcanizing composition. The resulting substantially anhydrous mixture will remain stable at temperatures up to 85° C. for one year or more until cure is effected by exposure to moisture.

The order of mixing the various ingredients, for example, the silanol-containing polydiorganosiloxane, pyrogenic silica filler, etc., is not critical. One procedure, for example, which can be employed is to mix the curing agent directly with the silanol-containing polydiorganosiloxane followed by addition of the pyrogenic silica filler or the curing agent can be added to the mixture of the pyrogenic silica filler or the silanol-containing polydiorganosiloxane, etc.

In order that those skilled in the art will be better able to practice the invention, the following examples are given by way of illustration and not by way of limitation. All parts are by weight.

EXAMPLE 1

A room temperature vulcanizing organo polysiloxane composition was prepared by mixing together under substantially anhydrous conditions 100 parts of a polydimethylsiloxane fluid having terminal silanol radicals and tertiary butoxy radicals and a viscosity of about 3,000 centipoises at 25° C., with 6.0 parts of a process aid consisting essentially of chemically combined trimethylsiloxy units, dimethylsiloxy units, and methylsiloxy units, and 33 parts of a pyrogenic silica filler having about 6.5 percent by weight of chemically combined trimethylsiloxy units and free of infrared absorbance at 3760 cm.$^{-1}$ The ratio of silanol radicals to tertiary butoxy radicals in the silanol-containing polydimethylsiloxane had a value of 2.76. The process aid employed was composed of about 2.9 mole percent of trimethylsiloxy units chemically combined with 19.9 mole percent of methylsiloxy units and 77.2 mole percent of dimethylsiloxy units based upon the total moles of siloxy units in the process aid, and 0.5 percent by weight of hydroxy radicals attached to silicon based on the weight of the process aid.

The pyrogenic silica filler was made by heating at a temperature of 150° C. for 6 hours, a mixture of a fume silica and 20 percent by weight of the mixture of hexamethyldisilazane in the presence of 0.5 percent by weight water. The weight percent of trimethylsiloxy units on the fume silica filler was calculated by elemental analysis for carbon and hydrogen by measuring weight percent in terms of carbon dioxide by standard analytical techniques. The weight percent was also calculated by infrared analysis. In addition to the aforementioned ingredients, there was also added to the mixture 6.0 parts of a 50 percent dispersion of red iron oxide and a silanol-containing polydimethylsiloxane fluid.

There was added under substantially anhydrous conditions to 100 parts of the above base mixture, 5.5 parts of tertiary butoxy triacetoxysilane to produce a room temperature vulcanizing organopolysiloxane composition. In addition, there was also added 0.06 percent by weight of dibutyl tin dilaurate based on the weight of the mixture.

The same procedure was repeated except that in place of using fume silica filler which had been contacted with hexamethyldisilazane, there was employed an equal weight of fume silica filler which had been contacted with octamethylcyclotetrasiloxane, in accordance with the teaching of Lucas Patent 2,938,009, assigned to the same assignee as the present invention.

The above-described room temperature vulcanizing organopolysiloxane composition containing the fume silica filler treated with hexamethyldisilazane (Beers et al.) under room temperature vulcanizing organopolysiloxane composition containing the fume silica filler treated with octamethylcyclotetrasiloxane (Control) were pressed onto a chrome plated steel mold to a thickness of about 75 mm. and allowed to cure under atmospheric conditions.

When the flow rate of the uncured material was measured at an air pressure of 90 p.s.i. through ⅛″ orifice, it was found that the Beers et al. composition had a flow rate of about 130 grams per minute, while the control had a flow rate of about 93 grams per minute.

The elastomeric sheets were obtained from the respective room temperature vulcanizing organopolysiloxane compositions after they were allowed to cure 72 hours under atmospheric conditions. The following table shows the results obtained, where H is hardness (Shore A), T is tensile (p.s.i.), E is elongation (percent), and T′ is tear strength (p.s.i.):

|  | H | T | E | T′ |
|---|---|---|---|---|
| Control | 38 | 700 | 380 | 85 |
| Beers | 32 | 825 | 560 | 160 |

EXAMPLE 2

A room temperature vulcanizing organopolysiloxane composition was prepared by mixing together under substantially anhydrous conditions, 100 parts of a polydimethylsiloxane fluid having terminal silanol radicals and a viscosity of 100,000 centipoises at 25° C., with 30 parts of a process aid consisting essentially of chemically combined trimethylsiloxy units and dimethylsiloxy units, and 25 parts of a pyrogenic silica filler having about 6.5 percent by weight of chemically combined trimethylsiloxy units and free of infrared absorbence at 3760 cm.$^{1}$, and 30 parts of ground quartz filler having a particle diameter of 5 microns.

The ratio of silanol radicals to tertiary butoxy radicals in the silanol-containing polydimethylsiloxane had a value of 2.76. The process aid employed was composed of about 5 mole percent of trimethylsiloxy units chemically combined with 95 mole percent of dimethylsiloxy units based upon the total moles of siloxy units in the process aid.

The pyrogenic silica filler was made by heating at a temperature of 150° C. for 6 hours, a mixture of a fume silica and 20 percent by weight of the mixture of hexamethyldisilazane in the presence of 0.5 percent by weight water. The weight percent of trimethylsiloxy units on the fume silica filler was calculated by elemental analysis for carbon and hydrogen by measuring weight per cent in terms of carbon dioxide by standard analytical techniques. In addition to the aforementioned ingredients, there was also added to the mixture 6 parts of a 50 percent dispersion of red iron oxide in a silanol end-stopped polydimethylsiloxane fluid.

There was added under substantially anhydrous conditions to 100 parts of the above base mixture, 5 parts of tertiary butoxy triacetoxysilane to produce a room temperature vulcanizing organopolysiloxane composition. In addition, there was also added 0.07 per cent by weight of dibutyl tin dilaurate based on the weight of the mixture.

The above-described room temperature vulcanizing organopolysiloxane compositions containing the fume silica filler treated with hexamethyldisilazane (Beers et al.) was pressed onto a chrome-plated steel mold to a thickness of 75 mm. and allowed to cure under atmospheric conditions.

Elastomeric sheets were obtained from the room temperature vulcanizing organopolysiloxane composition after they were allowed to cure 72 hours under atmospheric conditions.

The following table shows the results obtained, where H is hardness (Shore A), T is tensile (p.s.i.), E is elongation (percent), and T is tear strength (p.i.).

Beers:
    H _____ 28
    T _____ 750
    E _____ 600
    T′ _____ 120

EXAMPLE 3

A room temperature vulcanizing organopolysiloxane composition was prepared by mixing together under substantially anyhdrous conditions 100 parts of a polydimethylsiloxane fluid having terminal silanol radicals and terminal trimethylsiloxy radicals and a viscosity of about 10,000 centipoises at 25° C., with 30 parts of a pyrogenic silica filler having about 6.5 percent by weight of chemically combined trimethylsiloxy units and free of infrared absorbance at 3760 cm.$^{-1}$ The ratio of silanol radicals to trimethylsiloxy radicals in the silanol-containing polydimethylsiloxane had a value of 3.2

The pyrogenic silica filler was made by heating at a temperature of 150° C. for 6 hours, a mixture of a fume silica and 20 percent by weight of the mixture of hexamethyldisilazane in the presence of 0.5 percent by weight water. The weight percent of trimethylsiloxy units on the fume silica filler was calculated by elemental analysis for carbon and hydrogen by measuring weight per cent in terms of carbon dioxide by standard analytical techniques. In addition to the aforementioned ingredients,

United States Patent Office 3,541,044
Patented Nov. 17, 1970

---

3,541,044
SILANOL-CONTAINING ORGANOPOLYSILOXANE ADMIXED WITH REACTIVE FILLER AND CURING AGENT
Melvin D. Beers, Ballston Lake, and Alfred H. Smith, Jonesville, N.Y., assignors to General Electric Company, a corporation of New York
No Drawing. Filed Jan. 6, 1969, Ser. No. 789,354
Int. Cl. C08g 51/04; C08k 1/02
U.S. Cl. 260—37                               9 Claims

ABSTRACT OF THE DISCLOSURE

A substantially anhydrous organopolysiloxane composition curable to the elastomeric state upon exposure to moisture comprising
(A) a silanol-containing organopolysiloxane consisting essentially of chemically combined units of the formula, $$R'_2SiO$$

and terminal siloxy units selected from the class consisting of
  (a) silanol units of the formula, $$HOR_2SiO_{0.5}$$

and
  (b) a mixture of (a) and chain-stopping siloxy units of the formula, $$R''R_2SiO_{0.5}$$

wherein (b), the ratio of (a) to said chain-stopping siloxy units has a value greater than (1),
(B) a silanol reactive curing agent in an amount sufficient to effect the room temperature vulcanization of said organopolysiloxane composition,
(C) a reinforcing amount of a pyrogenic silica filler substantially free of infrared absorbance at 3760 cm.$^{-1}$ and having from about 1 percent to 20 percent by weight of chemically combined triorganosiloxy units of the formula, $$R_3SiO$$

where R is selected from the class consisting of monovalent hydrocarbon radicals and halogenated monovalent hydrocarbon radicals, R' is selected from the class consisting of monovalent hydrocarbon radicals, halogenated monovalent hydrocarbon radicals and cyanoalkyl radicals and R'' is selected from the class consisting of R' radicals and R$_3$CO radicals.

---

The present invention relates to curable organopolysiloxane compositions which vulcanize at room temperature to elastomers exhibiting superior toughness. In addition, the room temperature vulcanizing compositions of the present invention exhibit improved flow properties in the curable state.

Prior to the present invention, room temperature vulcanizing organopolysiloxane compositions, such as taught by Beers, Patent 3,382,205 assigned to the same assignee as the present invention, provided for significant advantages over available organopolysiloxane compositions curable to the elastomeric state at room temperatures. As shown by Beers, the aforementioned room temperature vulcanizing compositions provided for significant improvements with respect to shear strength, when allowed to cure to the elastomeric state in contact with a wire mesh screen and metal substrate, as compared to various room temperature vulcanizing compositions of the prior art. Even though significant improvements were achieved with the room temperature compositions taught in the aforementioned Beers patent, the use of these materials was often restricted to applications requiring elastomers having tear strengths up to about 40 (p.s.i.) and tensiles of about 400 p.s.i.

As taught in my copending application S.N. 634,828, filed May 1, 1967, now Patent No. 3,438,930, and assigned to the same assignee as the present invention, elastomers of improved toughness, i.e., having a tear strength of about 85 (p.s.i.) were obtainable by utilizing room temperature vulcanizing compositions having organopolysiloxane polymer terminated with a mixture of silanol radicals and tert-alkoxy radicals. It also has been found that the use of higher molecular weight silanol-containing organopolysiloxane polymers in such room temperature vulcanizing compositions has provided for improved tear strengths (p.s.i.). The use of such higher molecular weight polymers also has been found to substantially increase the viscosity of the resulting curable mixture and render it less flowable. Accordingly, the advantages of such room temperature vulcanizing organopolysiloxane compositions with respect to pourability, or ease of being dispensed from a tube or cartridge is substantially reduced even though elastomers having improved toughness can be made from such curable compositions.

The present invention is based on the discovery that a pyrogenic silica filler having at least about 1 percent by weight of chemically combined triorganosiloxy units of the formula, (1)                     $R_3SiO$ and substantially free of infrared absorbance at 3760 cm.$^{-1}$ can provide for room temperature vulcanizing compositions having improved flowability which are curable to the elastomeric state upon exposure to atmospheric moisture, where R is selected from monovalent hydrocarbon radicals and halogenated monovalent hydrocarbon radicals. The resulting elastomers also exhibit superior toughness, such as tear strengths as high as 200 (p.s.i.) and tensile strengths of 900 (p.s.i.).

There is provided by the present invention, a substantially anhydrous organopolysiloxane composition curable to the elastomeric state upon exposure to moisture comprising
(A) A silanol-containing organopolysiloxane consisting essentially of chemically combined units of the formula, (2)                     $R'_2SiO$ and terminal siloxy units selected from
(a) silanol units of the formula,
(3)                $HOR_2SiO_{0.5}$   and
(b) a mixture of (a) and chain-stopping siloxy units of the formula,
(4)                $R''R_2SiO_{0.5}$
    wherein (b), the ratio of (a) to said chain-stopping siloxy units has a value greater than (1),
(B) A silanol reactive curing agent in an amount sufficient to effect the room temperature vulcanization of said organopolysiloxane composition,
(C) A reinforcing amount of a pyrogenic silica filler substantially free of infrared absorbance at 3760 cm.$^{-1}$ and having from about 1 percent to 20 percent by weight of chemically combined triorganosiloxy units of Formula 1, where R' is selected from monovalent hydrocarbon radicals, halogenated monovalent hydrocarbon radicals and cyanoalkyl radicals and R'' is selected from R' radicals and R$_3$CO radicals.

Radicals included by R of the above formulas are, for example, mononuclear and binuclear aryl radicals, such as phenyl, tolyl, xylyl, naphthyl, etc.; halo mononuclear and binuclear aryl radicals, such as chlorophenyl, chloronaphthyl, etc.; aryl lower alkyl radicals, such as benzyl, phenylethyl, etc.; lower alkyl radicals, such as methyl, ethyl, propyl, butyl, pentyl, hexyl, heptyl, octyl, etc.; lower alkenyl radicals, such as vinyl, allyl, 1-propenyl, etc:; halo lower alkyl radicals, such as chloropropyl, trifluoropropyl, etc.; cycloalkyl radicals, such as cyclobutyl, cyclopentyl, cyclohexyl, etc. Radicals included by R' are, for example, all of the aforementioned R radicals and cyano lower alkyl radicals, such as cyanoethyl, cyanopropyl, cyanobutyl, etc. Radicals included by R" are R radicals and $R_3CO$ radicals, where $R_3CO$ is preferably a tert lower alkoxy radical, such as tert butoxy, tert amyloxy, etc. The term "lower" as used above to modify radicals, indicates that the radicals have no more than 8 carbon atoms in the hydrocarbon chain.

Some of the silanol-containing polydiorganosiloxane which can be employed in the present invention include silanol-terminated polydiorganosiloxane fluids of the formula, (5)

where R' is as previously defined, and $n$ is an integer equal to from 5 to 10,000 inclusive and preferably an average of 150 to 3,000 inclusive. These fluids can have viscosities in the range of 300 centipoises to 500,000 centipoises at 25° C., and preferably from 2,000 to 100,000 centipoises. These silanol-terminated polydiorganosiloxanes, such as a polydimethylsiloxane, can be made by reacting a hydrolyzable diorganosiloxane with a controlled amount of water in the presence of a suitable acid or base catalyst to tailor the viscosity of the polymer to the desired range. Polydiorganosiloxane which can be employed to make the silanol-terminated polydiorganosiloxanes can be also made by conventional equilibration procedures by heating a cyclic polydiorganosiloxane, for example, a cyclic polysiloxane containing from 3 to 8 chemically combined diorganosiloxy units, such as dimethylsiloxy units, methylphenylsiloxy units, methylvinylsiloxy units, etc., in the presence of a basic catalyst, such as potassium hydroxide. In order to convert the polydiorganosiloxane made by equilibrating the aforementioned polydiorganosiloxane to silanol-terminated polydiorganosiloxane having a particular viscosity, water can be added to the polydiorganosiloxane and the mixture heated between 150° C. to 200° C. for 8 hours or less. The mixture can then be decatalyzed and stripped to the desired viscosity. In instances where silanol-terminated polydiorganosiloxane is desired having a viscosity below 1200 centipoises at 25° C., steam pressure can be employed.

In addition to the silanol-terminated polydiorganosiloxanes of Formula 5, the silanol-containing organopolysiloxanes which can be employed in the practice of the present invention also include mixtures of such silanol-terminated polydiorganosiloxanes and silanol-containing organopolysiloxane of the formula, (6) 

where all of the terms are as previously defined. The silanol-containing organopolysiloxane of Formula 6 can be utilized in combination with the silanol-containing polydiorganosiloxanes of Formula 5 in amounts effective to provide for organopolysiloxane mixtures having a ratio of the sum of R' and R" radicals per silicon atom from about 1.95 to 2.01 and preferably from 2.00 to 2.003. The silanol-containing organopolysiloxanes of Formula 6 can be made by equilibrating a mixture of from about .01 to 20 mole percent of $R''R_2SiO_{0.5}$ units, and 80 mole percent to about 99.99 mole percent of $R'_2SiO$ units. A small amount of $R'SiO_{1.5}$ units may also be present provided the ratio does not fall below 1.95. The silanol-containing organopolysiloxanes of Formula 6 also can contain from about 0.02 to about 8 percent by weight of hydroxy radicals attached to silicon, based on the total weight of silanol-containing organopolysiloxane. In addition, these materials can have viscosities up to 500,000 centipoises at 25° C. Additional methods for making silanol-containing organopolysiloxane of Formula 6 are shown in copending application Ser. No. 634,828 of Melvin D. Beers, filed May 1, 1967 and assigned to the same assignee as the present invention. For example, tert-alkoxydiorganosilane of the formula,

can be employed in combination with silanol-terminated polydiorganosiloxane of Formula 5, where Y is a hydrolyzable radical. Included by $R''R_2SiO_{0.5}$ chain-stopping units are, for example,

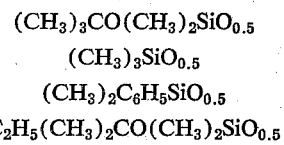

etc.

Curing agents which can be employed in the room temperature vulcanizing compositions of the present invention include hydrolyzable silanes of the formula, (7) 

where R" is as previously defined and Y is a hydrolyzable radical.

Hydrolyzable silanes included by Formula 7 are, for example, methyltrichlorosilane, phenyltrichlorosilane, etc.; example, methyltrichlorosilane,
phenyltrichlorosilane, etc.;
methyltriacetoxysilane,
phenyltriacetoxysilane,
tris-(acetoxy)-tert-butoxysilane,
tris-(propinoxy)-tert-amyloxy-silane, etc.;
tris-(dimethylamino)methylsilane,
tris-(isopropylamino)phenylsilane,
tris-(diethylamino)-tert-butoxy-silane, etc.;
tris-(diethylaminoxy)methylsilane,
tris-(diethylaminoxy)phenylsilane,
tris-(diethylaminoxy)-tert-butoxysilane, etc.;
tris-(isothiocyanate)methylsilane,
tris-(isothiocyanato)phenylsilane;
tris-(isothiocyanato)-tert-butoxysilane, etc.;
tris-(carbamato)methylsilane,
tris-(carbamato)phenylsilane,
tris-(carbamato)-tert-butoxysilane, etc.;
tris-(methlethylketoximato)methylsilane,
tris-(methylethylketoximato)phenylsilane,
tris-(methlethylketoximato)-tert-butoxysilane, etc.

The pyrogenic silica filler utilized in the practice of the invention can have a surface area of at least 50 square meters per gram, and preferably 100 to 500 square meters per gram. The pyrogenic silica filler can be made from silica filler produced by burning silanes, for example, silicon tetrachloride, trichlorosilane, etc., as taught by Spialter et al., Patent 2,614,906, Hugh et al., Patent 3,043,660, etc. Provided sufficient water is present, either as water absorbed on the surface of the filler resulting from normal contact with atmospheric moisture, or added externally, such as from 0.2 percent to 1 percent by weight of water, based on the weight of silica filler, such silica filler produced by the aforementioned fuming methods can be directly silylated. As a result of such silylation, a pyrogenic silica filler can be made having up to 20 percent by weight, and preferably from 2 to 12 percent by weight, based on the original weight of the silica filler of chemically combined triorganosiloxy units of Formula 1.

there was also added to the mixture 6 parts of a 50 percent dispersion of red iron oxide in a silanol-end-stopped polydimethylsiloxane fluid.

There was added under substantially anhydrous conditions to 100 parts of the above base mixture, 5.5 parts of tertiary butoxy triacetoxysilane to produce a room temperature vulcanizing organopolysiloxane composition. In addition, there was also added 0.07 percent by weight of dibutyl tin dilaurate based on the weight of the mixture.

The above-described room temperature vulcanizing organopolysiloxane compositions containing the fume silica filler treated with hexamethyldisilazane (Beers et al.) was pressed onto a chrome-plated steel mold to a thickness of 75 mm. and allowed to cure under atmospheric conditions.

Elastomeric sheets were obtained from the respective room temperature vulcanizing organopolysiloxane compositions after they were allowed to cure 72 hours under atmosphereic conditions. The following table shows the results obtained, where H is hardness (Shore A), T is tensile (p.s.i.), E is elongation (percent), and T is tear strength (p.i.):

Beers:
    H _____ 35
    T _____ 800
    E _____ 700
    T' _____ 170

EXAMPLE 4

A room temperature vulcanizing organopolysiloxane composition was prepared by mixing together under substantially anhydrous conditions 100 parts of a polydimethylsiloxane fluid having terminal silanol radicals and tertiary butoxy radicals and a viscosity of about 15,000 centipoises at 25° C., with 30 parts of a pyrogenic silica filler having about 65 percent by weight of chemically combined trimethylsiloxy units and free of infrared absorbance at 3760 cm.$^{-1}$ The ratio of silanol radicals to tertiary butoxy radicals in the silanol-containing polydimethylsiloxane had a value of 2.

The pyrogenic silica filler was made by heating at a temperature of 150° C. for 6 hours, a mixture of a fume silica and 20 percent by weight of the mixture of hexamethyldisilazane in the presence of 0.5 percent by weight water. The weight percent of trimethylsiloxy units on the fume silica was calculated by elemental anaylsis for carbon and hydrogen by measuring weight per cent in terms of carbon dioxide by standard analytical techniques.

There was added under substantially anhydrous conditions to 100 parts of the above base mixture, 5.5 parts of tertiary butoxy triacetoxysilane to produce a room temperature vulcanizing organopolysiloxane composition. In addition, there was also added 0.07 percent by weight of dibutyl tin dilaurate based on the weight of the mixture.

The same procedure was repeated except that in place of using fume silica filler which had been contacted with hexamethyldisilazane, there was employed an equal weight of fume silica filler which had been contacted with octamethylcyclotetrasiloxane, in accordance with the teaching of Lucas Patent 2,938,009, assigned to the same assignee as the present invention.

The above-described room temperature vulcanizing organopolysiloxane compositions containing the fume silica filler treated with hexamethyldisilazane (Beers et al.) and the room temperature vulcanizing organopolysiloxane composition containing the fume silica filler treated with octamethylcyclotetrasiloxane (Control) were pressed onto a chrome-plated steel mold to a thickness of 75 mm. and allowed to cure under atmospheric conditions.

Elastomeric sheets were obtained from the respective room temperature vulcanizing organopolysiloxane compositions after they were allowed to cure 72 hours under atmospheric conditions. The following table shows the results obtained, where H is hardness (Shore A), T is tensile (p.s.i.), E is elongation (percent), and T' is tear strength (p.i.):

|  | H | T | E | T' |
|---|---|---|---|---|
| Control | 26 | 650 | 600 | 90 |
| Beers | 22 | 800 | 900 | 180 |

EXAMPLE 5

A room temperature vulcanizing organopolysiloxane composition was prepared by mixing together under substantially anhydrous conditions 100 parts of a polydimethylsiloxane fluid having terminal silanol radicals and tertiary butoxy radicals and a viscosity of about 3,000 centipoises at 25° C., with 6.0 parts of a process aid consisting essentially of chemically combined trimethylsiloxy units, dimethylsiloxy units, and methylsiloxy units, and 33 parts of a pyrogenc silica filler.

The ratio of silanol radicals to tertiary butoxy radicals in the silanol-containing polydimethylsiloxane had a value of 2.76. The process aid employed was composed of about 2.9 mole percent of trimethylsiloxy units chemically combined with 19.9 mole percent of methylsiloxy units and 77.2 mole percent of dimethylsiloxy units based upon the total moles of siloxy units in the process aid and 0.5 percent by weight of hydroxy radicals attached to silicon based upon the weight of the process aid.

The pyrogenic silica filler was made by heating at a temperature of 150° C. for 6 hours, a mixture of fume silica filler which had been contacted with octamethylcyclotetrasiloxane, in accordance with the teaching of Lucas Patent 2,938,009, and 15 percent by weight of the mixture of hexamethyldisilazane in the presence of 0.5 percent by weight water. The weight percent of trimethylsiloxy units on the fume silica filler was calculated by elemental analysis for carbon and hydrogen by measuring weight percent in terms of carbon dioxide by standard analytical techniques.

There was added under substantially anhydrous conditions to 100 parts of the above base mixture, 5.5 parts of tertiary butoxy triacetoxysilane to produce a room temperature vulcanizing organopolysiloxane composition. In addition, there was also added 0.06 percent by weight of dibutyl tin dilaurate based on the weight of the mixture.

The above-described room temperature vulcanizing organopolysiloxane compositions containing the treated fume silica filler was pressed onto a chrome-plated steel mold to a thickness of 75 mm. and allowed to cure under atmospheric conditions.

Elastomeric sheets were obtained from the room temperature vulcanizing organopolysiloxane composition after they were allowed to cure 72 hours under atmospheric conditions. The following table shows the results obtained, where H is hardness (Shore A), T is tensile (p.s.i.), E is elongation (percent), and T' is tear strength (p.i.):

H _____ 34
T _____ 800
E _____ 540
T' _____ 140

EXAMPLE 6

A room temperature vulcanizing organopolysiloxane composition was prepared by mixing together under substantially anhydrous conditions 100 parts of a polydimethylsiloxane fluid having terminal silanol radicals and tertiary butoxy radicals and a viscosity of about 3,000 centipoises at 25° C., with 6.0 parts of a process aid consisting essentially of chemically combined trimethylsiloxy units, dimethylsiloxy units, and methylsiloxy units, and 33 parts of a pyrogenic silica filler having about 6.5 percent by weight of chemically combined trimethylsiloxy units and free of infrared absorbance 3760 cm.$^{-1}$.

The ratio of silanol radicals to tertiary butoxy radicals in the silanol-containing polydimethylsiloxane had a value of 2.76. The process aid employed was composed of about 2.9 mole percent of trimethylsiloxy units chemically combined with 19.9 mole percent of methylsiloxy units and 77.2 mole percent of dimethylsiloxy units based upon the total moles of siloxy units in the process aid and 0.5 percent by weight of hydroxy radicals attached to silicon based upon the weight of the process aid.

The pyrogenic silica filler was made by heating at a temperature of 150° C. for 6 hours, a mixture of a fume silica and 20 percent by weight of the mixture of hexamethyldisilazane in the presence of 0.5 percent by weight water. The weight percent of trimethylsiloxy units on the fume silica filler was calculated by elemental analysis for carbon and hydrogen by measuring weight percent in terms of carbon dioxide by standard analytical techniques.

There was added under substantially anhydrous conditions to 100 parts of the above base mixture, 4.0 parts of methyltriacetoxysilane to produce a room temperature vulcanizing organopolysiloxane composition. In addition, there was also added 0.01 percent by weight of dibutyl tin dilaurate based on the weight of the mixture.

The above-described room temperature vulcanizing organopolysiloxane composition containing the fume silica filler treated with hexamethyldisilazane was pressed onto a chrome-plated steel mold to a thickness of 75 mm. and allowed to cure under atmospheric conditions.

Elastomeric sheets were obtained from the room temperature vulcanizing organopolysiloxane composition after they were allowed to cure 72 hours under atmospheric conditions. The following table shows the results obtained, where H is hardness (Shore A), T is tensile (p.s.i.), E is elongation (percent), and T' is tear strength (p.i.):

H _____ 29
T _____ 780
E _____ 620
T' _____ 165

EXAMPLE 7

A room temperature vulcanizing organopolysiloxane composition was prepared by mixing together under substantially anhydrous conditions 100 parts of a polydimethylsiloxane fluid having terminal silanol radicals and tertiary butoxy radicals and a viscosity of about 3,000 centipoises at 25° C., with 6.0 parts of a process aid consisting essentially of chemically combined trimethylsiloxy units, dimethylsiloxy units, and methylsiloxy units, and 33 parts of a pyrogenic silica filler having about 6.5 percent by weight of chemically combined trimethylsiloxy units and free of infrared absorbance 3760 cm.$^{-1}$.

The ratio of silanol radicals to tertiary butoxy radicals in the silanol-containing polydimethylsiloxane had a value of 2.76. The process aid employed was composed of about 2.9 mole percent of trimethylsiloxy units chemically combined with 19.9 mole percent of methylsiloxy units and 77.2 mole percent of dimethylsiloxy units based upon the total mole of siloxy units in the process aid and 0.5 percent by weight of hydroxy radicals attached to silicon based upon the weight of the process aid.

The pyrogenic silica filter was made by subjecting 100 parts of fume silica having a surface area of 200 square meters per gram to an ammonia atmosphere for two hours at 30° C. and atmospheric pressure. Then 10 parts of hexamethyldisilazane was added to the filler, mixed in and reacted for two hours at 140° C. To the mixture was then added ½ part of water in the form of steam and the mixing was continued for an additional hour at 140° C. at atmospheric pressure. The filler was then devolatilized using a nitrogen purge until the NH$_3$ content of the filler was less than 50 p.p.m.

There was added under substantially anhydrous conditions to 100 parts of the above base mixture, 5.5 parts of tertiary butoxy triacetoxysilane to produce a room temperature vulcanizing organopolysiloxane composition. In addition, there was also added 0.06 percent by weight of dibutyl tin dilaurate based on the weight of the mixture.

The above-described room temperature vulcanizing organopolysiloxane composition containing the fume silica filler treated with hexamethyldisilazane was pressed onto a chrome-plated steel mold to a thickness of 75 mm. and allowed to cure under atmospheric conditions.

Elastomeric sheets were obtained from the room temperature vulcanizing organopolysiloxane composition after they were allowed to cure 72 hours under atmospheric conditions. The following table shows the results obtained, where H is hardness (Shore A), T is tensile (p.s.i.), E is elongation (percent), and T' is tear strength (p.s.i.):

H _____ 33
T _____ 840
E _____ 600
T' _____ 170

What we claim as new and desire to secure by Letters Patent of the United States is:

1. A substantially anhydrous organopolysiloxane composition curable to the elastomeric state upon exposure to moisture comprising
    (A) a silanol-containing organopolysiloxane consisting essentially of chemically combined units of the formula, $$R'_2SiO$$

and terminal siloxy units selected from the class consisting of
        (a) silanol units of the formula, $$HOR_2SiO_{0.5}$$

and
        (b) a mixture of (a) and chain-stopping siloxy units of the formula, $$R''R_2SiO_{0.5}$$

wherein (b), the ratio of (a) to said chain-stopping siloxy units has a value greater than (1),
    (B) a silanol reactive curing agent in an amount sufficient to effect the room temperature vulcanization of said organopolysiloxane composition,
    (C) a reinforcing amount of a pyrogenic silica filler substantially free of infrared absorbance at 3760 cm.$^{-1}$ and having from about 1 percent to 20 percent by weight of chemically combined triorganosiloxy units of the formula, $$R_3SiO$$

where R is selected from the class consisting of monovalent hydrocarbon radicals and halogenated monovalent hydrocarbon radicals, R' is selected from the class consisting of monovalent hydrocarbon radicals, halogenated monovalent hydrocarbon radicals and cyanoalkyl radicals and R'' is selected from the class consisting of R' radicals and R$_3$CO radicals.

2. A curable composition in accordance with claim 1, where the silanol-containing organopolysiloxane has terminal silanol units.

3. A curable composition in accordance with claim 1, where the silanol-containing organopolysiloxane has a mixture of said terminal silanol units and said chain-stopping siloxy units.

4. A curable composition in accordance with claim 1, containing a process aid composed of chemically combined R$_3$SiO$_{0.5}$ units. R$_2$SiO units, and RSiO$_{1.5}$ units, where R is as defined in claim 1.

5. A curable composition in accordance with claim 1, containing a polydiorganosiloxane fluid having terminal triorganosiloxy units.

6. A curable composition in accordance with claim 1, where the pyrogenic silica filler has at least 2 percent by weight of chemically combined $(CH_3)_3SiO_{0.5}$ units.

7. A curable composition in accordance with claim 1, where the silanol-containing organopolysiloxane is a silanol-containing polydimethylsiloxane.

8. A curable composition in accordance with claim 1, containing a process aid composed of chemically combined methylsiloxy units, dimethylsiloxy units, and methylsiloxy units having from about 0.02 to 2 percent by weight of hydroxy radicals attached to silicon.

9. A curable composition in acordance with claim 1, comprising 100 parts of a silanol-containing polydimethylsiloxane having terminal units selected from the class consisting of (a) silanol radicals
(b) a mixture of (a) and trimethylsiloxy units
(c) a mixture of (a) and tertiary butoxy dimethylsiloxy units, wherein (b) and (c), the ratio of (a) to said trimethylsiloxy units and tertiary butoxy dimethylsiloxy units has a value exceeding 1.

References Cited
UNITED STATES PATENTS

| | | |
|---|---|---|
| 3,004,859 | 10/1961 | Lichtenwalner. |
| 3,015,645 | 1/1962 | Tyler. |
| 3,122,516 | 2/1964 | Polmanteer. |
| 3,122,520 | 2/1964 | Lentz. |

MORRIS LIEBMAN, Primary Examiner

L. T. JACOBS, Assistant Examiner